United States Patent
Yamamoto et al.

[11] 3,875,142
[45] Apr. 1, 1975

[54] PROCESS FOR PREPARING 2,3-DIHYDRO-1H-BENZODIAZEPINE DERIVATIVES AND THEIR SALTS

[75] Inventors: Hisao Yamamoto, Nishinomiya; Shigeho Inaba, Takarazuka; Tadashi Okamoto, Ashiya; Toshiyuki Hirohashi, Kobe; Kikuo Ishizumi, Minoo; Michihiro Yamamoto, Takarazuka; Isamu Maruyama, Minoo; Kazuo Mori, Kobe; Tsuyoshi Kobayashi, Minoo; Takahiro Izumi, Takarazuka, all of Japan

[73] Assignee: Sumitomo Chemical Company, Ltd., Osaka, Japan

[22] Filed: May 10, 1972

[21] Appl. No.: 252,140

Related U.S. Application Data

[63] Continuation of Ser. No. 829,760, June 2, 1969, abandoned.

[30] Foreign Application Priority Data
June 5, 1968    Japan.................................. 43-38902
Feb. 28, 1969   Japan.................................. 44-15666

[52] U.S. Cl................. 260/239 BD, 260/268 TR, 260/268 PH, 260/309.7, 260/326.13 R
[51] Int. Cl............................................. C07d 53/06
[58] Field of Search............................. 260/239 BD

[56] References Cited
UNITED STATES PATENTS
3,243,427   3/1966   Reeder et al.................. 260/239 BD OTHER PUBLICATIONS
Hofmann, Imidazole and Derivatives, Part I, (Interscience, New York, 1953), pages 226–229, QD401H6.

*Primary Examiner*—Alton D. Rollins
*Attorney, Agent, or Firm*—Stevens, Davis, Miller & Mosher

[57] ABSTRACT

2,3-Dihydro-1H-benzodiazepine derivatives, and their salts, represented by the formula,

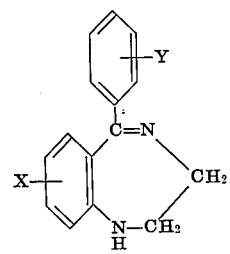
(I)

wherein X and Y signify respectively a hydrogen atom, a halogen atom or a trifluoromethyl group, which are useful as tranquillizers, muscle-relaxants and hypnotics, are produced by contacting imidazolidino benzophenone derivative represented by the formula,

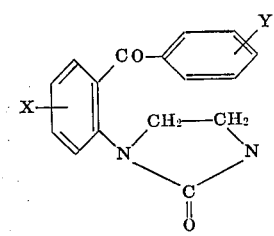
(II)

wherein X and Y are as defined in the formula (I) with basic hydrolyzing agent.

The imidazolidino benzophenone derivative is prepared by oxidizing a piperazino-(1,2-a)-indole derivative represented by the formula,

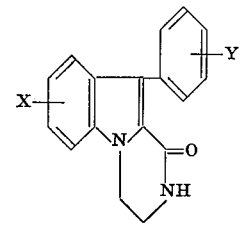

wherein X and Y are as defined in the formula (I), and then contacting the resultant piperazino-benzophenone derivative represented by the formula,

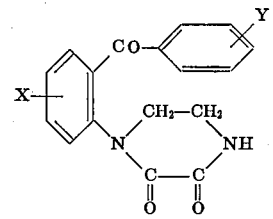

wherein X and Y are as defined in the formula (I), with an acid.

8 Claims, No Drawings

PROCESS FOR PREPARING 2,3-DIHUDRO-1H-BENZODIAZEPINE DERIVATIVES AND THEIR SALTS

This is a continuation of application Ser. No. 829,769 filed June 2, 1969, and now abandoned.

This invention relates to a method for producing 2,3-dihydro-1H-1,4-benzodiazepine derivatives, and salts thereof, represented by the general formula (I),

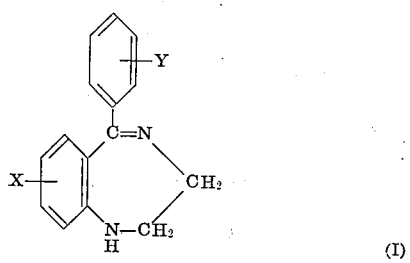

(I)

wherein X and Y signify respectively a hydrogen atom, a halogen atom or a trifluoromethyl group.

In the compound represented by the aforesaid formula (I), the halogen atom includes chlorine, bromine, iodine and fluorine atoms.

The compounds represented by the formula (I) are effective as tranquillizers, muscle-relaxants and hypnotics and are useful for medicines.

A few processes for producing the benzodiazepine derivatives of the formula (I) have been described. For instance, the benzodiazepine derivatives have been prepared by cyclizing 2-glycylamido-benzophenone derivative and reducing the resultant 2,3-dihydro-1H-1,4-benzodiazepine-2-one derivative (L. H. Sternbach, E. Reeder and C. A. Archer, J. Org. Chem., 28, 2456).

On the other hand, the present inventors have found that the benzodiazepine derivatives of the formula (I) can be smoothly and economically prepared by contacting with a basic hydrolyzing agent a novel imidazolidino-benzophenone derivative having the general formula (II),

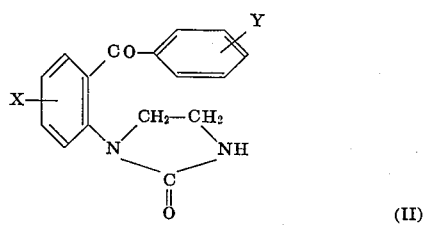

(II)

wherein X and Y are as defined in the formula (I).

An object of the present invention is to provide a novel process for preparing 2,3-dihydro-1H-1,4-benzodiazepine derivatives and their salts.

Another object of the present invention is to provide novel imidazolidino-benzophenone derivative.

Other objects of the present invention will become apparent from the description which follows.

In order to accomplish these objects, the present invention provides a process for producing 2,3-dihydro-1H-1,4-benzodiazepine derivatives, and salts thereof, represented by the formula (I) which comprises contacting with a basic hydrolyzing agent an imidazolidino-benzophenone derivative represented by the general formula (II) in a liquid medium.

The compounds represented by the formula (II) are novel and have not heretofore been described in any literature, and exhibit moderate or potent central nervous system depressant activities.

The imidazolidino-benzophenone derivative represented by the general formula (II) is prepared by contacting with an acid a piperazino-benzophenone derivative represented by the general formula (III),

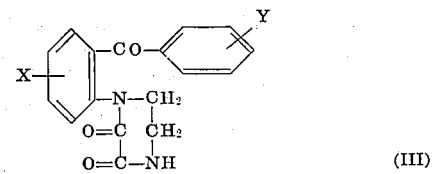

(III)

wherein X and Y are as defined above in the formula (I) in a liquid medium.

The compound represented by the formula (III), which is a starting material of the invention, is also a novel compound and is prepared easily, for example, by the oxidation of a piperazino-(1,2-a)-indole derivative represented by the formula (IV),

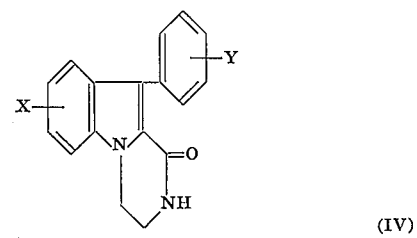

(IV)

wherein X and Y are as defined above.

The piperazinoindole derivative represented by formula (IV) can be obtained from a 1-cyanomethylindole-2-carboxylic acid derivative of formula,

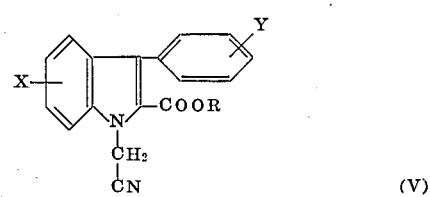

(V)

wherein X and Y have the same meanings as defined above and R means hydrogen atom or an alkyl group having 1 to 4 carbon atoms by contacting it with a reducing agent.

The reaction is carried out advantageously by catalytic reduction. Catalysts used are platinum oxide, palladium, Raney nickel, nickel boride Raney cobalt and the like. The hydrogen may be used at an appropriate pressure, preferably atmospheric pressure. The reaction is usually carried out at room temperature but may be carried out at elevated temperatures.

For example, 7-chloro-9-phenyl-10-oxo-piperazino-(1,2-a)-indole may be prepared by adding to a solution of 10 g. of 1-cyanomethyl-2-carbo-ethoxy-3-phenyl-5-chloro-indole in 100 ml. of tetrahydrofuran a catalyst which is prepared from 50 percent Raney nickel alloy by treating with an aqueous solution of sodium hydroxide at 100°C. for one hour.

To the mixture is absorbed 2 moles of hydrogen under atmospheric pressure at 18°C. for 12 hours till the reduction is finished.

After the catalyst is removed by filtration, tetrahydrofuran is evaporated under reduced pressure and the residue is dissolved in hot ethanol.

The mixture is allowed to stand overnight in a refrigerator. The crystals produced are collected by filtration. Recrystallization from a mixture of ethanol and a small amount of benzene gives 3.6 g. of light yellow needles of 7-chloro-9-phenyl-10-oxo-piperazino-(1,2-a)-indole, melting point, 244.5° – 245°C.

According to the method similar to this example, the following piperazinoindole derivatives may, for example, be obtained:
7-chloro-9-phenyl-10-oxo-piperazino-(1,2-*a*)-indole,
7-chloro-9-(p-chlorophenyl)-10-oxo-piperazino-(1,2-*a*)-indole,
7-bromo-9-phenyl-10-oxo-piperazino-(1,2-*a*)-indole,
7-chloro-9-(o-fluorophenyl)-10-oxo-piperazino-(1,2-*a*)-indole and
6-chloro-9-phenyl-10-oxo-piperazino-(1,2-a)-indole.

The 1-cyanomethylindole-2-carboxylic acid derivative of formula (V) can be prepared by treating the indole derivative represented by formula,

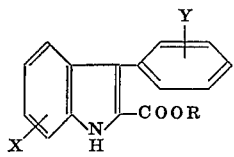

(VI)

wherein X, Y and R have the same meanings as defined above, with a reactive ester of cyanomethyl alcohol in the presence of a basic condensing agent or after forming their basic metal salts by treating them with basic condensing agents.

Reactive esters of cyanomethyl alcohol used here include halides and sulfonic acid esters. The halides include chlorides, bromides and iodides, while the sulfonic acid esters include, for example, methylsulfonic acid ester, paratoluene sulfonic acid ester and β-naphthalene sulfonic acid ester.

Basic condensing agents used include, for example, alkali metals, alkaline earth metals, alkali metal hydrides, alkaline earth metal hydrides, alkali metal hydroxides, alkaline earth metal hydroxides, alkali metal amides, alkaline earth metal amides, alkali metal alkoxides, alkaline earth metal alkoxides, alkyl alkali metals and aryl alkali metals and the like. Sodium hydride, lithium hydride, sodium amide, potassium amide, and lithium amide are preferably used.

The reaction is usually carried out in a solvent. The solvents used are benzene, toluene, xylene, dimethyl formamide, dioxane and liquid ammonia or the like.

For example, 1-cyanomethyl-2-ethoxycarbonyl-3-phenyl-5-chloro-indole may be prepared by adding to a mixture of 1.1 g. of 50 percent sodium hydride and 10 ml. of dimethylformamide a solution of 6 g. of 2-ethoxycarbonyl-3-phenyl-5-chloro-indole in 30 ml. at 30° – 35°C.

After stirring for 15 minutes, at 30°C., a solution of 1.7 g. of chloroacetonitrile in 10 ml. of dimethylformamide is added dropwise at 30° – 35°C. and the mixture is stirred for 1 hour at 25° – 30°C. Water is added thereto, and the mixture is extracted with ether. The ethereal layer is washed with water and dried over sodium sulfate. The solvent is removed by distillation to give 7 g. of a solid substance. To the solid is added 100 ml. of hexane and the mixture is filtered to give 5.5 g. of 1-cyanomethyl-2-ethoxycarbonyl-3-phenyl-5-chloro-indole. The crystals are recrystallized from a solvent mixture of benzene and hexane to give slightly yellow needles having a melting point of 126.5° – 127°C.

According to the method similar to this example, the following compounds are obtained:
1-cyanomethyl-3-phenyl-indole,
1-cyanomethyl-2-methoxycarbonyl-3-phenyl-indole,
1-cyanomethyl-2-methoxycarbonyl-3-phenyl-5-chloro-indole,
1-cyanomethyl-2-ethoxycarbonyl-3-phenyl-indole,
1-cyanomethyl-2-ethoxycarbonyl-3-phenyl-5-chloro-indole,
1-cyanomethyl-2-ethoxycarbonyl-3-phenyl-5-bromo-indole,
1-cyanomethyl-2-ethoxycarbonyl-3-phenyl-6 (or 4)-chloro-indole,
1-cyanomethyl-2-ethoxycarbonyl-3-phenyl-7-chloro-indole,
1-cyanomethyl-2-ethoxycarbonyl-3-(o-chlorophenyl)-5-chloro-indole,
1-cyanomethyl-2-ethoxycarbonyl-3-(o-fluorophenyl)-5-chloro-indole and
1-cyanomethyl-2-ethoxycarbonyl-3-(p-chlorophenyl)-5-chloro-indole.

In the procedure of the present invention benzodiazepine derivatives of the formula (I) can be smoothly and economically prepared by contacting an imidazolidino-benzophenone derivative having the formula (II) with a basic hydrolyzing agent in a liquid medium. The basic hydrolyzing agent in this process includes, for example, sodium hydroxide, potassium hydroxide, lithium hydroxide, barium hydroxide, calcium hydroxide, ammonium hydroxide, sodium carbonate and potassium carbonate.

This reaction is desirably effected in the presence of a liquid medium selected from the group consisting of water, acetone, methanol, ethanol, tetrahydrofuran and the like.

The reaction progresses at an elevated temperature, preferably a boiling point of the liquid medium.

The benzodiazepine derivatives having the formula (I) are converted to salts by treatment with a mineral acid such as hydrochloric, sulfuric, nitric or phosphoric acid or with an organic acid such as maleic, fumaric, succinic, formic, acetic or tartaric acid.

According to the process of the present invention, there are produced such benzodiazepine derivatives and acid addition salts thereof as shown below.
5-phenyl-2,3-dihydro-1H-1,4-benzodiazepine
5-phenyl-7-chloro-2,3-dihydro-1H-1,4-benzodiazepine
5-phenyl-8(or 6)-chloro-2,3-dihydro-1H-1,4-benzodiazepine
5-phenyl-7-bromo-2,3-dihydro-1H-1,4-benzodiazepine
5-(o-chlorophenyl)-2,3-dihydro-1H-1,4-benzodiazepine
5-(o-chlorophenyl)-7-chloro-2,3-dihydro-1H-1,4-benzodiazepine
5-(o-fluorophenyl)-2,3-dihydro-1H-1,4-benzodiazepine 5-(o-fluorophenyl)-7-chloro-2,3-dihydro-1H-1,4-
benzodiazepine
5-(p-chlorophenyl)-7-chloro-2,3-dihydro-1H-1,4-
benzodiazepine
5-(p-bromophenyl)-7-chloro-2,3-dihydro-1H-1,4-
benzodiazepine
and their hydrochloric acid, hydrobromic acid, phosphoric acid, succinic acid, acetic acid, fumaric acid, maleic acid salts.

The imidazolidino-benzophenone derivative having the formula (II) can be prepared by contacting a piperazino-benzophenone derivative of the formula (III) with an acid in a liquid medium. The reaction is carried out in the presence of a liquid medium such as water, methanol, ethanol, acetone, dioxane, ethylene glycol and the like. The reaction proceeds at the boiling point of the liquid medium in the presence of an acid, for example, hydrochloric acid hydrobromic acid, sulfuric acid, p-toluenesulfonic acid and the like.

According to the process of the present invention, there are produced such imidazolidino-benzophenone derivatives of the formula (II) as shown below.

2-(2''-oxo-imidazolidino)-benzophenone
2-(2''-oxo-imidazolidino)-5-chloro-benzophenone
2-(2''-oxo-imidazolidino)-5-bromo-benzophenone
2-(2''-oxo-imidazolidino)-6-chloro-benzophenone
2-(2''-oxo-imidazolidino)-5,2'-dichloro-
benzophenone
2-(2''-oxo-imidazolidino)-5-chloro-2'-fluoro-
benzophenone
2-(2''-oxo-imidazolidino)-5-chloro-2'-bromo-
benzophenone
2-(2''-oxo-imidazolidino)-5,4'-dichloro-
benzophenone
2-(2''-oxo-imidazolidino)-5-chloro-4'-bromo-
benzophenone This invention is further disclosed in the following example, which are presented for purposes of illustration and are not intended to limit the scope of the invention.

EXAMPLE 1

5-Phenyl-7-chloro-2,3-dihydro-1H-1,4-
benzodiazepine

A mixture of 3.3 g. of 2-(2', 3'-dioxo-piperazino)-5-chloro-benzophenone, 10 ml. of concentrated hydrochloric acid and 30 ml. of water is refluxed for 30 min. The reaction mixture is concentrated to a residue, to which is added aqueous sodium carbonate and extracted with chloroform.

The chloroform extract is washed with water, dried over anhydrous sodium sulfate and concentrated under reduced pressure to an oily residue, which is crystallized from ethanol to give 2-(2''-oxo-imidazolidino)-5-chloro-benzophenone having a melting point of 220°–221°C.

To a solution of 2 g. of sodium hydroxide in 5 ml. of water and 50 ml. of ethanol is added 3.3 g. of 2-(2''-oxo-imidazolidino)-5-chloro-benzophenone.

The reaction mixture is refluxed for 10 hours, to which is added 50 ml. of water and the mixture is refluxed for additional 17 hours.

The solvent is removed under reduced pressure. The residue is washed with hot water to give 2 g. of yellow solid. The solid was recrystallized from ethanol to give 5-phenyl-7-chloro-2,3-dihydro-1H-1,4-benzodiazepine having a melting point of 173°C.

Similarly, using the procedure mentioned above, but replacing 2-(2''-oxo-imidazolidino)-5-chloro-benzophenone employed as the intermediary material in Example 2 by 2-(2''-oxo-imidazolidino)-benzophenone, 2-(2''-oxo-imidazolidino)-5-bromo-benzophenone, 2-(2''-oxo-imidazolidino)-2',5-dichloro-benzophenone, 2-(2''-oxo-imidazolidino)-5-chloro-2'-fluoro-benzophenone and 2-(2''-oxo-imidazolidino)-5-trifluoromethyl-benzophenone, there are obtained 5-phenyl-2,3-dihydro-1H-1,4-benzodiazepine (m.p. 144° – 146°C.), 5-phenyl-7-bromo-2,3-dihydro-1H-1,4-benzodiazepine (m.p. 173° – 175°C.), 5-(o-chloro-phenyl)-7-chloro-2,3-dihydro-1H-1,4-benzodiazepine (m.p. 175° – 177°C.), 5-(o-fluoro-phenyl)-7-chloro-2,3-dihydro-1H-1,4-benzodiazepine (m.p. 161° – 163°C.) and 5-phenyl-7-trifluoromethyl-2,3-dihydro-1H-1,4-benzodiazepine (m.p. 110° – 111°C.) respectively.

EXAMPLE 2

5-Phenyl-7-trifluoromethyl-2,3-dihydro-1H-1,4-
benzodiazepine hydrochloride 5-phenyl-7-trifluoromethyl-2,3-dihydro-1H-1,4-benzodiazepine is dissolved in methanol. A solution of hydrochloric acid in methanol is added to the solution under cooling and the mixture is stirred for 1 hour.

The reaction mixture is concentrated under reduced pressure to a residue, which is washed with benzene to give 5-phenyl-7-trifluoromethyl-2,3-dihydro-1H-1,4-benzodiazepine hydrochloride. Recrystallization from methanol-ether gives yellow crystals, m.p. 283° – 285°C.

What we claim is:

1. A process for producing 2,3-dihydro-1H-1,4-benzodiazepine derivatives, and their salts, represented by the formula,

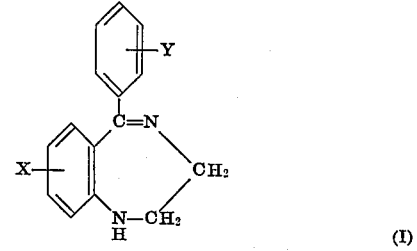

(I)

wherein X and Y signify respectively a hydrogen atom or a halogen atom; which process comprises contacting with a basic hydrolyzing agent an imidazolizino-benzophenone derivative represented by the formula,

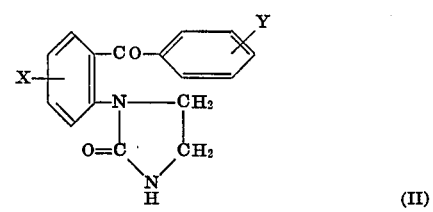

(II)

wherein X and Y are as defined above, in a liquid medium.

2. A process according to claim 1, wherein the basic hydrolyzing agent is sodium hydroxide, potassium hydroxide, lithium hydroxide, barium hydroxide, calcium hydroxide, ammonium hydroxide, sodium bicarbonate or potassium carbonate.

3. A process according to claim 1, wherein the liquid medium is water, acetone, methanol, ethanol or tetrahydrofuran.

4. A process according to claim 1, wherein the reaction is carried out at a boiling point of the liquid medium.

5. A process for producing 2,3-dihydro-1H-1,4-benzodiazepine derivatives, and their salts, represented by the formula,

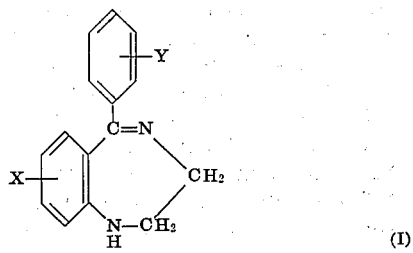

(I)

wherein X and Y signify respectively a hydrogen atom or a halogen atom; which process comprises heating with an acid a piperazino-benzophenone derivative represented by the formula,

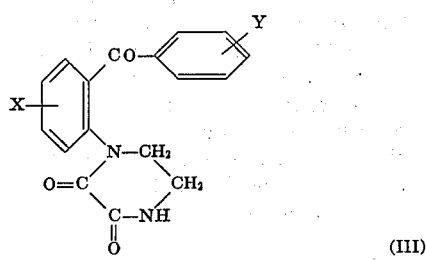

(III)

wherein X and Y are as defined above, in a liquid medium, and then contacting with a basic hydrolyzing agent the resultant imidazolizino-benzophenone derivative represented by the formula,

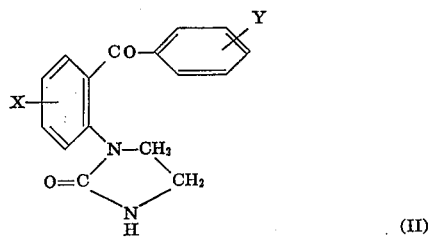

(II)

wherein X and Y are as defined above, in a liquid medium.

6. A process according to claim 5, wherein the acid is hydrochloric acid, hydrobromic acid, sulfuric acid or p-toluenesulfonic acid.

7. A process according to claim 5, wherein the liquid medium is water, methanol, ethanol, acetone, dioxane or ethyleneglycol.

8. A process according to claim 5, wherein the reaction of the piperazino-benzophenone derivative with the acid is carried out at a boiling point of the liquid medium.

* * * * *